United States Patent
Hinz et al.

(10) Patent No.: US 8,418,921 B2
(45) Date of Patent: Apr. 16, 2013

(54) APPARATUS AND PROCESS FOR IDENTIFYING OBJECT

(75) Inventors: Jonas Hinz, Bonn (DE); Oliver Dimmer, Bitburg (DE)

(73) Assignee: Agfa HealthCare NV, Mortsel (BE)

( * ) Notice: Subject to any disclaimer, the term of this patent is extended or adjusted under 35 U.S.C. 154(b) by 249 days.

(21) Appl. No.: 12/745,874

(22) PCT Filed: Dec. 2, 2008

(86) PCT No.: PCT/EP2008/066583
§ 371 (c)(1),
(2), (4) Date: Jun. 21, 2010

(87) PCT Pub. No.: WO2009/071525
PCT Pub. Date: Jun. 11, 2009

(65) Prior Publication Data
US 2010/0294841 A1     Nov. 25, 2010

(30) Foreign Application Priority Data
Dec. 7, 2007   (EP) .................................. 07122654

(51) Int. Cl.
*G06K 7/10*      (2006.01)
*G06K 19/06*     (2006.01)
(52) U.S. Cl.
USPC ..................... 235/385; 235/462.07; 235/494
(58) Field of Classification Search .................. 235/385, 235/462.01, 462.07, 494
See application file for complete search history.

(56) References Cited

U.S. PATENT DOCUMENTS

| | | | | |
|---|---|---|---|---|
| 4,835,372 A | * | 5/1989 | Gombrich et al. | 235/375 |
| 6,098,892 A | * | 8/2000 | Peoples, Jr. | 235/494 |
| 2009/0078774 A1 | * | 3/2009 | He | 235/462.41 |

FOREIGN PATENT DOCUMENTS

| | | |
|---|---|---|
| JP | 08-007014 A | 1/1996 |
| JP | 2006048500 A | 2/2006 |
| WO | 2005/050390 A2 | 11/2004 |

OTHER PUBLICATIONS

International Preliminary Report on Patentability dated Jul. 6, 2010, from International Application No. PCT/EP2008/066583, filed Dec. 2, 2008.
International Search Report mailed Jan. 27, 2009, from International Application No. PCT/EP2008/066583, filed Dec. 2, 2008.

* cited by examiner

*Primary Examiner* — Christle Marshall
(74) *Attorney, Agent, or Firm* — Houston & Associates, LLP (57) ABSTRACT

The invention relates to an apparatus (10) and a corresponding process for identifying an object (20) with an article dependently upon a piece of barcode information detected from a barcode (30) with which the object (20) is identified. Here a number of article numbers are stored in a memory (60) which are assigned, on the one hand, to a number of articles and on the other hand to a number of different article number types. According to the invention, the piece of barcode information detected is compared with article numbers stored in the memory (60) dependently upon a specified sequence of article number types. In the case of the piece of barcode information detected corresponding with one of the stored article numbers, the object (20) is identified with the article assigned to this article number.

23 Claims, 4 Drawing Sheets

APPARATUS AND PROCESS FOR IDENTIFYING OBJECT

The present invention relates to an apparatus and to a corresponding process for identifying an object with an article dependently upon a piece of barcode information detected from a barcode with which the object is identified.

In establishments providing care, such as e.g. a hospital or a pharmacy, a plurality of goods are required on a daily basis, such as e.g. drugs and others, in particular medical materials and equipment, provisions or food, in order to guarantee problem-free operation in the nursing and care of patients. For this purpose well-organised materials administration supported by appropriate systems is required. Forming part of these types of system are scanner-supported detection devices with which supporting documents or objects, such as e.g. medicine packages, provided among other things with specific identifiers, can be detected. Used as identifiers here are barcodes which can be read by the detection device.

There are different types of barcode, such as e.g. EAN8, EAN13, Code39, Code128 or Interleaved 2 of 5. For example, barcode types EAN8 and EAN13, which have a length of eight or thirteen numbers, are used to identify general merchandise, the abbreviation "EAN" designating the "European Article Number" article number type. In contrast, the Code39 barcode type is used with a fixed length of seven numbers for the "Pharmacentral number" (PCN) article number type which is assigned to drugs and other pharmacy items.

When identifying objects, the barcodes with which the individual objects are identified are initially read and decoded by a scanner-supported detection device. By means of the respective barcode information obtained, and which essentially comprises a sequence of characters, the article assigned to this piece of barcode information with which the object is ultimately identified, is finally established. It is generally necessary here to specify the respective barcode or article number type manually so that the object can be clearly identified by means of the piece of barcode information.

When identifying a series of objects identified with barcodes of different barcode and article number types, in general every time that the barcode or article number type changes, this must be manually specified by the user so that the object can be correctly identified. In these cases the identification of objects is relatively complex for the user.

This object is achieved by an apparatus or a process for identifying an object with an article dependently upon a piece of barcode information detected from a barcode with which the object is identified, in which in a memory a number of article numbers are stored which on the one hand are assigned to a number of articles and on the other hand are assigned to a number of different article number types (PCN, EAN, IAN, SAN) and the piece of barcode information detected are compared with article numbers stored in the memory dependently upon a specified sequence of article number types (PCN, EAN, IAN, SAN), and in the case of the piece of barcode information detected corresponding with one of the stored article numbers the object being identified with the article assigned to this article number.

This object is achieved by an apparatus according to the technical teaching of claim 1 and by a corresponding process according to the technical teaching of claim 14.

According to the invention a memory is provided in which a number of article numbers are stored. The article numbers are assigned, on the one hand, to a number of articles, and on the other hand to a number of different article number types. Control is implemented such that it compares the piece of barcode information detected dependently upon a specified sequence of article number types with article numbers stored in the memory and, in the case of the piece of barcode information corresponding to one of the stored article numbers, it identifies the object with the article assigned to this article number.

The piece of barcode information detected is first of all only compared here with those stored article numbers which are assigned to the article number type which is in the first position of the specified sequence of article number types. In the case of the piece of barcode information detected corresponding to one of the stored article numbers of this article number type, the object is identified with the article assigned to this article number. If no correspondence is established between the piece of barcode information detected and one of the stored article numbers of this article number type, in one or more further steps the piece of barcode information detected is compared with further stored article numbers which are respectively assigned to the article number type which is in the next position, i.e. in the second, third etc. position in the specified sequence of article number types.

Contrary to the known apparatuses and processes with which during identification of a series of different objects specification of the respective barcode or article number type by the user is generally required again and again, with the present invention only a one-off specification of a sequence of article number types is required before starting to identify the different objects. By means of the specified sequence of article number types according to which the respective stored article numbers are compared with the piece of barcode information detected, the complexity associated with establishing the article number which corresponds to the piece of barcode information detected is greatly reduced.

Overall, the invention allows convenient and rapid identification of objects by means of the piece of barcode information detected in a technically simple way.

An "object" within the context of the present invention can be a thing to be identified, a case to be identified, or also a person to be identified, for example a patient. The barcode with which the object is identified can be applied to the thing itself, e.g. to a medicine package, or to a barcode carrier assigned to the thing, the case or the person, such as e.g. a label on a patient's bed.

The term "article" within the context of the invention indicates the identity of the respective object, i.e. the thing, the case or the person, or the association of the object with a group of objects of a similar type and which are characterised by different characteristics or features, also called master data features. These characteristics or features comprise, for example, a designation, a name, a package size etc.

If the object is e.g. a specific medicine package, the article with which this medicine package is identified stands abstractly for a medicine characterised by a specific name, e.g. "ABC" and active agent, e.g. "XYZ" and a specific package size, e.g. X tablets. If, in contrast, the object is a label with a barcode on the patient's bed, the article with which the label is identified stands for the person who is identified e.g. by their name, place of birth and address, or for the medical or organisational case which is identified e.g. by the hospitalisation date and the diagnosis.

Depending on the field of application of the invention, a plurality of different article number types can be provided. When using the invention in a hospital or a pharmacy the following article number types in particular are provided: PCN (Pharmacentral Number), EAN (European Article Number), IAN (Internal Article Number) and SAN (Supplier Article Number of the supplier of the object).

In principle a number of article numbers of different article number types can respectively be assigned to the articles. Therefore, a medicine can have both an article number of the PCN type and an article number of the IAN type if this medicine is given a particular internal article number in addition to the PCN for different purposes.

Preferably, an article number stored in the memory and to which a specific article number type is assigned is clearly assigned to an article. The consequence of this is that if the piece of barcode information detected from a barcode corresponds to an article number of a specific type, the object identified with the barcode can be clearly identified with the article assigned to this article number.

Preferably the sequence of article number types is specified such that for the respective application it is highly likely that the article item number sought will be found under the article number type initially to be checked. For example, for an application in a pharmacy the sequence of article number types can advantageously be specified such that the Pharmacentral Number PCN is specified as the first article number type. This means that in order to identify an object provided with a barcode, such as e.g. a medicine package, when searching for the article number to which the piece of barcode information detected from the barcode corresponds, the stored article numbers which are assigned to the PCN article number type are initially compared to the piece of barcode information detected.

In one advantageous embodiment of the invention a detection device for reading the barcode and for detecting the piece of barcode information contained in the latter is provided. In order to communicate the piece of barcode information detected from the read barcode to the control, the detection device is connected to the latter. In this way the piece of barcode information can be easily detected from the barcode and transferred to the control in order to identify the object.

In a further advantageous embodiment the control is further implemented such that it additionally compares the piece of barcode information detected dependently upon at least one characteristic of the piece of barcode information detected with article numbers stored in the memory. In this way the object can be identified even more efficiently. For example, a characteristic of the piece of barcode information detected can be the length of the latter, i.e. its number of characters, numbers and special characters. By means of this characteristic of the piece of barcode information the sequence of article number types can then be specified or, optionally, a sequence already specified can be modified.

In a preferred embodiment of this version of the invention the control is implemented such that an article number type of the specified sequence of the article number types, in particular the first article number type in the specified sequence, is missed out dependently upon the at least one characteristic of the piece of barcode information detected when comparing the piece of barcode information detected with article numbers stored in the memory. For example, in the case of a piece of barcode information detected which has a length of thirteen characters, it is not necessary to compare the piece of barcode information detected with stored article numbers which are assigned to the PCN article number type because this article number type is generally encoded with a barcode of the Code39 type, and consequently has a length of seven characters. A stored article number which is assigned to the PCN article number type thus differs in its length characteristic from the piece of barcode information detected. If the PCN article number type is placed before other article number types in the specified sequence of article number types, such as e.g. before an EAN article number type which can have article numbers with a length of thirteen characters, the PCN article number type and so all of the stored article numbers assigned to this article number type is missed out when comparing with the piece of barcode information detected. In this way the object can be identified even more efficiently and more rapidly.

Preferably, a specific sequence of article number types is specified as a standard sequence. In this way the present invention can be used particularly conveniently. Identification of the object can take place here automatically, optionally using a number of article number types, without the sequence of article number types necessarily having to be specified beforehand by a user or in some other way.

It is advantageous to implement the control such that it establishes the sequence of article number types dependently upon at least one piece of information. Due to this the control is very flexible and can easily be adjusted to different factors and applications in order to establish an optimal sequence of article number types for the respective factors or application. The piece of information can, for example, be determined by the control itself or be specified from outside.

In one advantageous embodiment of this aspect of the invention the at least one piece of information is an application- or environment-dependent piece of information which is dependent upon the application of the apparatus and/or the environment in which the apparatus is being operated. Due to this the sequence of article number types can be adapted particularly well and simply to a specific application or environment.

For example, one might be dealing with the detection of a medicine as an application or a pharmacy as an environment so that the effect of the application-dependent piece of information (detection of a medicine) or environment-dependent piece of information (pharmacy) is that the control places the PCN article number type in the first position in the sequence of specified article number types. The EAN, IAN and SAN article number types, for example, could be placed in the second, third and fourth positions.

In a hospital kitchen a kitchen employee's name, for example, can serve as an application- or environment-dependent piece of information. The control can then be implemented e.g. such that after detecting the name of the employee it first of all assigns the latter automatically to the hospital kitchen and then, on the basis of this assignment, specifies of sequence of article number types which is dependent e.g.

upon the frequency of the article number types to be expected in the kitchen area. Therefore e.g. the EAN article number type can be placed in the first and the PCN article number type in the final position.

Preferably, an inputting device is provided for the inputting of the sequence of article number types by a user. In this way the user can himself easily and conveniently input the optimal sequence for his needs. In particular, the desired sequence can be defined freely by the user. The inputting device can be, for example, a keyboard.

In a further advantageous embodiment the control is implemented such that it suggests to the user a number of pre-defined, different sequences of article number types from which he can choose. This advantageously makes it possible for the user to establish the sequence particularly easily and conveniently.

In a particularly preferred embodiment of the invention the control is implemented such that it establishes a sequence of article number types dependently upon a specified article number type. The specified article number type is preferably selected by a user here. In particular, the specified article number type selected by the user is then in the first position of the sequence established. The examples described below are intended to illustrate this.

If e.g. the PCN article number type is selected by a user before identifying a series of objects, the control establishes the sequence of article number types as follows: PCN, EAN, IAN, SAN.

If, however, the EAN article number type is selected by a user, the following sequences, for example, are established by the control: EAN, IAN, SAN, PCN or EAN, PCN, IAN, SAN.

In this way the series of article number types, e.g. EAN, IAN, SAN, following the specified article number type, e.g. PCN, can be adapted to the specified article number type in view of rapid, reliable identification of the different objects.

Moreover, it is preferred to implement the control so that it only compares part of the piece of barcode information detected dependently upon the specified sequence of article number types with article numbers stored in the memory. This is particularly advantageous if the piece of barcode information detected contains further details in addition to the article number which are not required for identifying the object. In this way identification can be further optimized and carried out even more quickly, in particular if the piece of barcode information was encoded in a barcode of the inter-leaved type.

Further advantages of the invention can be learnt from the following description of exemplary embodiments, reference being made to the attached drawings. These show as follows.

In the following, unless specified to the contrary, the same reference numbers will be used for the same elements or elements with the same effect.

Figure 1:
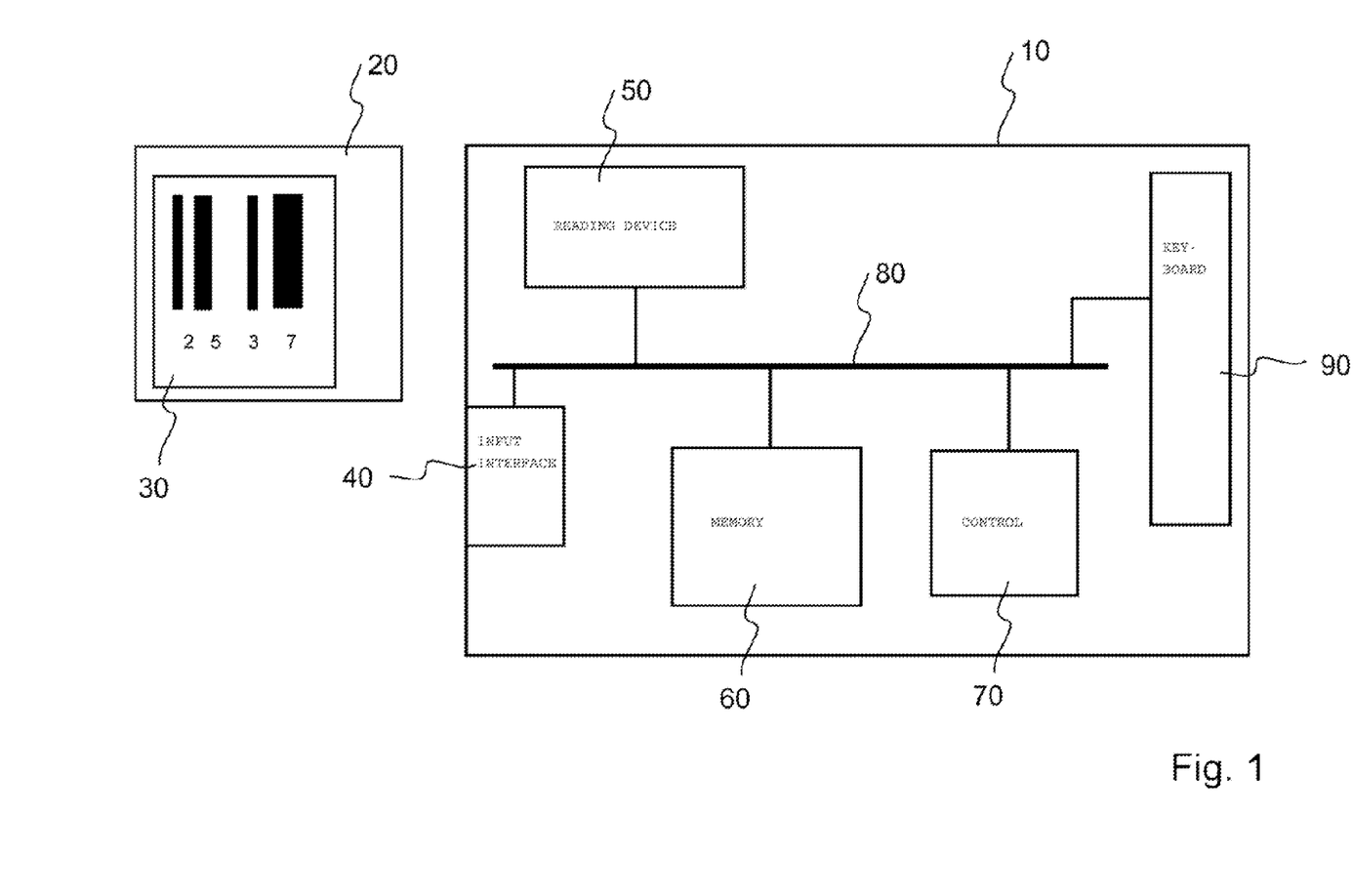
FIG. 1 an exemplary embodiment of an apparatus according to the invention.

FIG. 1 shows an exemplary embodiment of an identification apparatus 10 according to the invention for identifying an object. In the present exemplary embodiment the identification apparatus 10 is used in a hospital. However, it is also possible to use the identification apparatus 10 in another application or in another environment, such as e.g. a pharmacy.

The object can be a thing, e.g. a medicine, or a person, such as e.g. a patient in the hospital. In the identification apparatus 10 the object is identified with a previously stored article, e.g. a specific medicine or a specific patient.

In principle the identification apparatus 10 supports a number of different processes for which the identification of an object is required or helpful, such as e.g. in materials administration. Supported processes here are, for example, materials requirements, purchase requisitions, incoming goods, outgoing goods, returned goods, annual inventories, order proposals or incoming delivery notes.

Moreover, the identification apparatus 10 advantageously also supports identification of a patient, for example when detecting food which will be described in greater detail below.

In the present exemplary embodiment the object is a medicine package 20 which is to be recorded in the hospital's incoming goods for the latter's materials administration system. The medicine package 20 is identified by a barcode 30 with which a specific piece of barcode information is encoded. The piece of barcode information includes in particular an article number which is assigned to the medicine package 20.

In order to detect the piece of barcode information the barcode 30 is read and decoded by a reading device, i.e. a scanner. Here the reading device can automatically process different types of barcode such as e.g. Code39, Code128, EAN13, EAN8, Interleaved 2 of 5. The decoded, detected piece of barcode information is available at the output of the reading device.

In the present exemplary embodiment the identification apparatus 10 has an input interface 40 via which the piece of barcode information detected from the barcode 30 by an external reading device can be received by the identification apparatus 10. In the example illustrated the identification apparatus 10 has its own reading device 50 which is capable of reading barcodes of objects, i.e. also the barcode 30 of the medicine package 20, and of detecting the piece of barcode information encoded therein. The piece of barcode information detected from the barcodes 30 can therefore either be fed to the identification apparatus 10 from outside via the input interface 40 or be detected by the reading device 50.

The identification apparatus 10 further contains a memory 60 in which a plurality of article numbers are stored. These article numbers are assigned on the one hand to a number of articles and on the other hand to a number of different article number types. Storage of the article numbers is advantageously realised here in the form of a table by means of which the assignment of article numbers to the articles and the article number types can particularly easily be converted. An example of this type of table is illustrated by Table 1.

TABLE 1

Assignment of article numbers to articles 1 to 8 and article number types PCN, EAN, IAN and SAN.

| Article | Article number type | | | |
| --- | --- | --- | --- | --- |
| | PCN | EAN | IAN | SAN |
| 1 | 2345678 | | 1234 | 12345678 |
| 2 | | 12345678 | | 12345670 |
| 3 | | 23456789 | | 23456701 |
| 4 | | | 3456 | 34567012 |
| 5 | | 45678901 | | 45670123 |
| 6 | 5678901 | | | 56701234 |
| 7 | | | 6789 | 67012345 |
| 8 | | 78901234 | | 70123456 |

In Table 1 a number of article numbers such as e.g. 12345678, 2345678, 3456 and 12345670 are entered as examples. The article numbers are on the one hand assigned to different articles 1 to 8 and on the other hand to different article number types, namely PCN (Pharmacentral Number), EAN (European Article Number), IAN (Internal Article Number) and SAN (Supplier Article Number of the supplier of the object).

Here a number of article numbers of different article number types can also be assigned to different articles 1 to 8. In Table 1 article number 2345678 of article number type PCN, article number 1234 of article number type IAN and article number 12345678 of article number type SAN are for example assigned to article 1.

In addition to the article number or the article numbers further data or properties, which are preferably deposited in the respective line, are generally assigned to each article 1 to 8 (not shown). With a medicine these are e.g. specification of the name of the medicine, of the active substance and of the respective package size.

The article number types correspond to different types of article numbers and generally have different formats, in particular different article number lengths. The different article number types are generally assigned by different organisations or official centres. Therefore, the EAN and the PCN are respectively assigned by central centres and are specific to the respective goods or the respective article. However, in the example shown, the particular internal article number IAN is assigned by the hospital itself to specific goods or articles such as e.g. medicines. In the case described here the supplier article number SAN is assigned by suppliers to goods or articles which they supply to the hospital.

In Table 1 the different article number types are specified in a particular sequence by means of which a hierarchy of the article number types is defined. In the present exemplary embodiment the PCN is in the first position in this sequence, then the EAN, then the particular article number IAN, and lastly the supplier article number SAN. This is identified in Table 1 by the sequence of positions of the article number types from left to right. The specified sequence of article number types specifies the sequence in which article numbers are compared with the piece of barcode information previously detected from the barcode 30.

In order to make these comparisons the identification apparatus 10 has a control 70 which is implemented correspondingly. The control 70, the memory 60, the reading device 50 and the inlet interface 40 are respectively connected here to a bus 80 by means of which they can communicate with one another and exchange data. The communication of the different components of the identification apparatus 10 is controlled by the control 70.

The control 70 successively compares the piece of barcode information detected dependently upon the specified sequence of article number types with the article numbers stored in the memory 60. In the present example according to Table 1 the article numbers are therefore first of all compared with the piece of barcode information detected, which is assigned to the first article number type PCN, from top to bottom. In the case of the piece of barcode information detected corresponding with one of the article numbers which are assigned to the first article number type PCN, the object with the article to which this article number is assigned is identified. Identification of the object is then completed.

If no correspondence can be found, the control compares the piece of barcode information detected with the article numbers which are assigned to the next article number type in the specified sequence, namely EAN. If no correspondence can be found here either, the control compares the piece of barcode information detected with the article numbers which are assigned to the then subsequent article number type in the specified sequence, namely the particular article number. If no correspondence can be found here either, the control compares the piece of barcode information detected with the article numbers which are assigned to the last article number type in the specified sequence, namely the supplier article number.

If the control 70 can not establish any correspondence then either, it advantageously initiates the issue of a corresponding message, in particular a fault report, to a user.

In the present exemplary embodiment the medicine package 20 is identified by a barcode 30 of barcode type Code39. Encoded as barcode information with barcode 30 is an article number 5678901 which has article number type PCN. This article number 5678901 is detected by the reading device 50 as a piece of barcode information and forwarded to the control 70. The control 70 now compares the article number 5678901 detected with the article numbers which are assigned to the first article number type PCN in the specified sequence of article number types.

Therefore, the first article number 2345678 of article number type PCN stored in Table 1 is first of all compared with the piece of barcode information detected. Since there is no correspondence the control 70 compares the next article number 5678901 of article number type PCN stored in Table 1 with the piece of barcode information detected. A correspondence is then established here. The control 70 can then identify the medicine package 20 with the article 6 which is assigned to the corresponding article number 5678901. Characteristics of the medicine package 20 are assigned to the article 6 as an object to be identified, such as e.g. the name and the active agent of the medicine and the package size.

The medicine package 20 can therefore be identified simply with a specific article and be detected by the hospital's materials administration system.

The specification according to the invention of the sequence of article number types for identifying an object is particularly advantageous if a number of articles have the same article number which is assigned to different article number types. This is the case in the example of Table 1 for articles 1 and 2. Article number 12345678 of the article number type supplier article number SAN is assigned to article 1. The same article number 12345678 is assigned to article 2 as article number type EAN. If, therefore, article number 12345678 is to be detected as a piece of barcode information, article 2 is determined as the article with which the object is identified since the article number type EAN is positioned before the article number type supplier article number in the specified sequence PCN, EAN, IAN, SAN. By means of the invention in such cases a clear assignment of the object to an article is guaranteed in a simple way.

Different criteria and approaches can be provided for specifying the sequence of article number types in the identification apparatus 10.

For example, a specific sequence of article number types can be specified as a standard sequence. This standard sequence can advantageously be specified automatically by the control 70. It is then only amended if corresponding amendment specifications are fed to the control 70 or established by it itself.

It is also possible to establish the sequence of article number types dependently upon at least one piece of information. This piece of information can in particular be an application- or environment-dependent piece of information which is dependent upon an application or environment in which the apparatus is being operated. In the case of the hospital's received materials as an application or environment the name of an employee who records the newly supplied material for the materials administration system, for example, can serve as an application-dependent piece of information. This employee must be registered so that his name is known to the identification apparatus 10. By means of an assignment of the name to his function within the hospital stored in the memory 60 the control 70 can automatically assign this employee to received materials. In the sequence of article number types the control 70 then automatically places the PCN article number type in the first and the EAN article number type in the second position. The further article number types can, for example, be downstream of these two article number types in any sequence.

The sequence of subsequent article number types of the sequence of article number types can be established, for example, by the control 70 dependently upon one or a number of initially specified article number types of the sequence of article number types. If e.g. upon the basis of an application-dependent piece of information the EAN article number type is specified as the first article number type in the sequence, the subsequent sequence is then, for example, established automatically by the control 70 such that the PCN article number types, supplier article number and finally the particular article number follow.

An inputting device is advantageously provided for the inputting of the sequence of article number types by a user. This is the case with a keyboard 90 with the identification apparatus 10. The keyboard 90 is also connected to the bus 80 in order to be able to communicate with the other components of the identification apparatus 10.

In particular, upon the basis of the user's specifications inputted by means of the keyboard 90 in the memory the control 70 sets the sequence of article number types correspondingly. Therefore, the user can himself input, in particular freely, the optimal sequence of article number types for his needs. For this purpose the control can optionally be designed such that it suggests to the user a number of pre-defined, different sequences of article number types from which he can choose.

The control 70 can advantageously be implemented such that it only compares part of the piece of barcode information detected dependently upon the specified sequence of article number types with article numbers stored in the memory 60.

Advantageously, the control 70 is additionally capable of comparing the piece of barcode information detected from the barcode 30 dependently upon at least one of its characteristics, such as e.g. its length, with article numbers stored in the memory and to specify the sequence of article number types dependently upon the at least one characteristic. For this purpose the control 70 can miss out an article number type of the specified sequence dependently upon the at least one characteristic of the piece of barcode information detected when comparing the piece of barcode information detected with article numbers stored in the memory. In the above example illustrated by means of Table 1 the article numbers of the PCN article number type given first in the specified sequence can, for example, be missed out during the comparison if it is established beforehand that the piece of barcode information detected has at least eight characters. Since the article numbers of the PCN article number type are generally only seven characters long, this can then not be a PCN article number type.

Advantageously, the control 70 investigates the piece of barcode information detected with regard to the at least one of its characteristics. It is also possible, however, to communicate details of the characteristics of the piece of barcode information to the control 70 from outside of the identification apparatus 10.

Figure 2A:
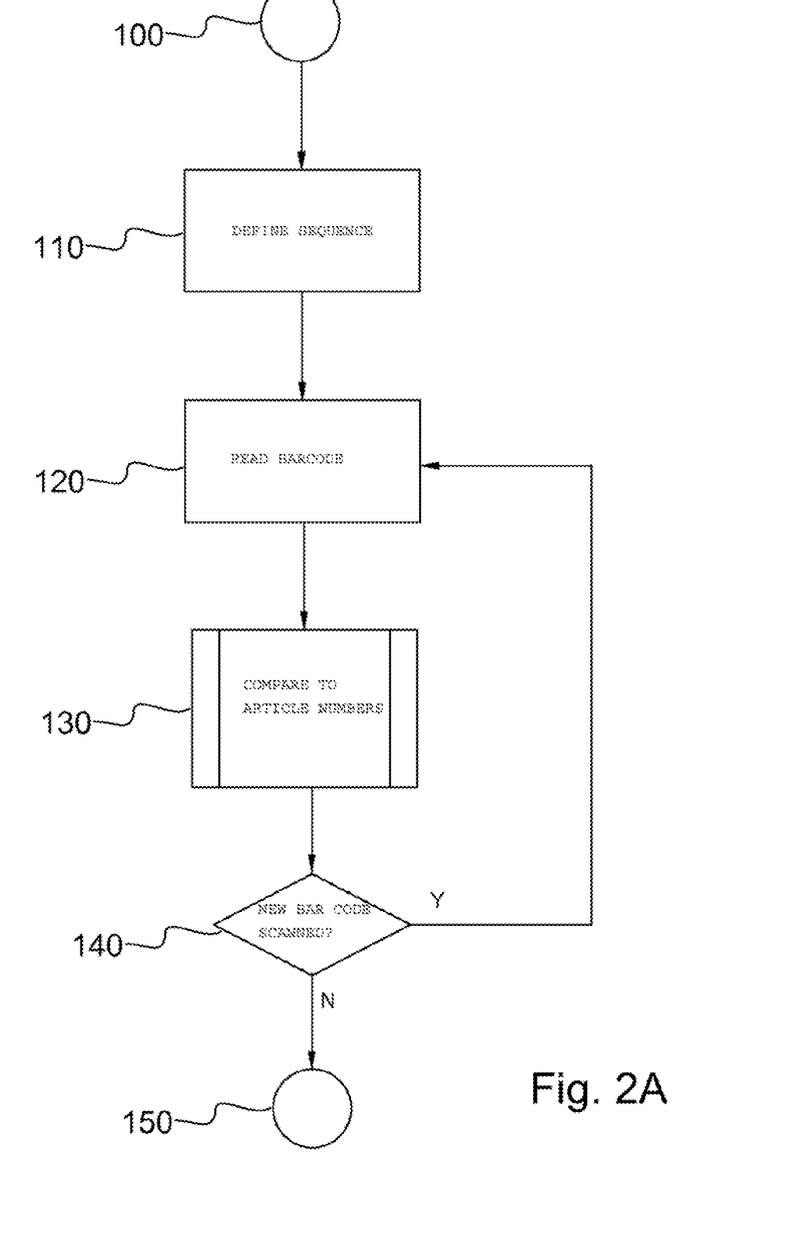
FIGS. 2A, B flow diagrams of an exemplary embodiment of the process according to the invention, and FIG. 3 a further exemplary embodiment of an apparatus according to the invention in an application in a system for detecting food in a hospital.
Figure 2B:
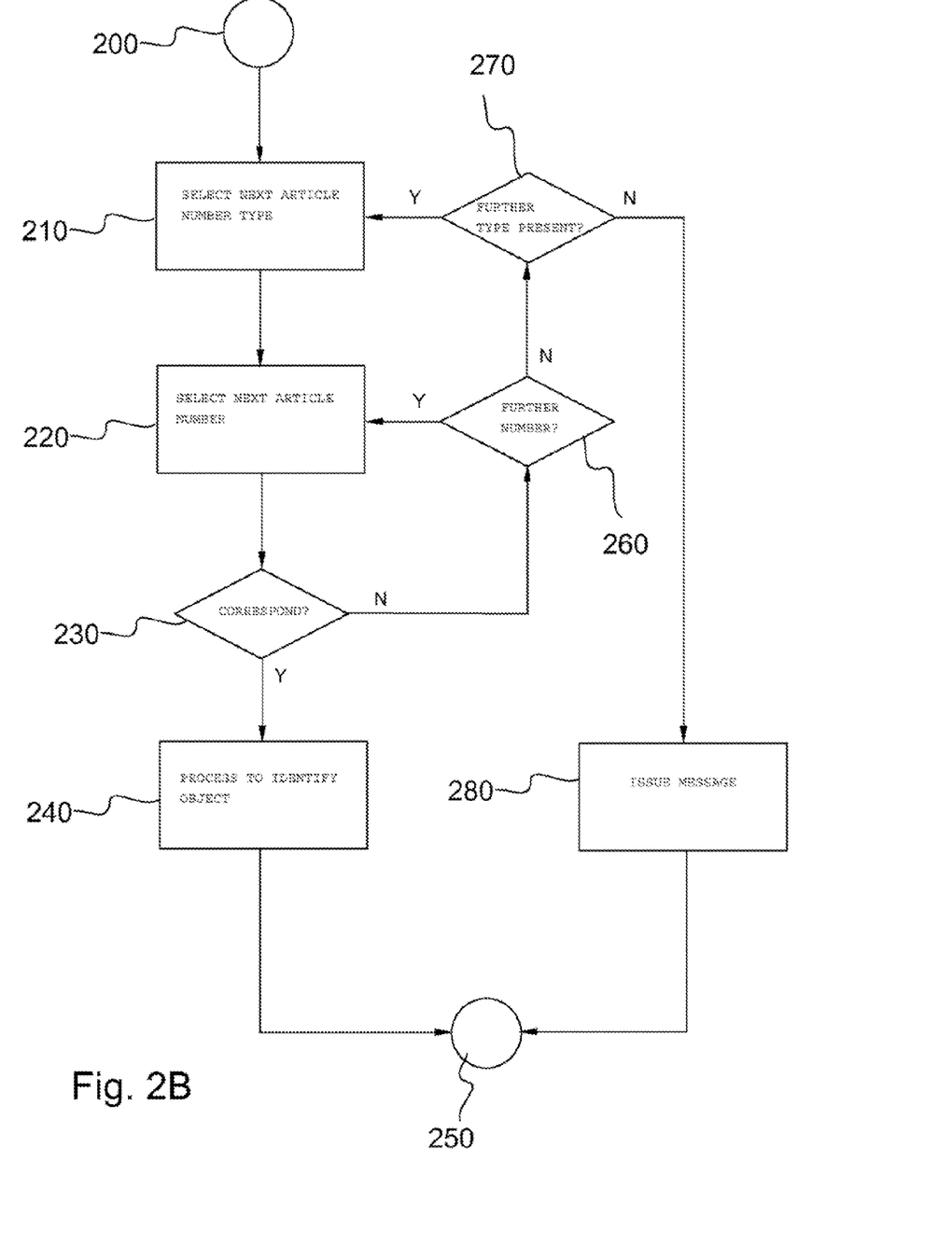

FIGS. 2A and B show flow diagrams of an exemplary embodiment of the process according to the invention. The procedure of the process according to the invention can be implemented, in particular, by the control 70 by means of the identification apparatus 10.

FIG. 2A shows a procedural step 100 in which the automatic identification of the object, for example the medicine package 20, starts. In a subsequent step 110 the sequence of article number types by means of which the stored article numbers are later to be compared with the piece of barcode information detected is then defined. In a step 120 the barcode with which the object to be identified is identified is then read and the piece of barcode information from the latter is detected. In a step 130 this piece of barcode information is then compared with the article numbers in accordance with the specified sequence of article number types in order to determine the article number with which there is a correspondence. By means of the article assigned to the specific article number the object is then identified. The step 130 is described in greater detail below by means of FIG. 2B.

In a following step 140 it is then checked whether a new barcode with which a further object to be identified is identified has been scanned. If this is the case, the process is then continued with step 120. If this is not the case, a step 150 then follows in which the identification of objects is completed.

FIG. 2B shows the flow diagram of the different sub-steps of procedural step 130 according to FIG. 2A. In a step 200 identification of the object starts. Next, in a step 210 a next article number type from the sequence previously established in step 110 is selected. In a step 220 a next stored article number is selected, which is assigned to the article number type selected in step 210. It is then checked in a step 230 whether the selected article number corresponds to the piece of barcode information detected. If this is the case this correspondence is then processed in a step 240, and the object identified by means of the article assigned to the article number found. In a step 250 the identification of the object is then completed and the process branches off to step 140.

If it is then established in step 230, however, that the article number selected does not correspond to the piece of barcode information detected, then the process according to the invention branches off to a step 260 in which it is checked whether a further article number is assigned to the article number type selected. If this is the case, the process then branches off to step 220 and selects the next article number. If this is not the case, step 260 is followed by a step 270 in which it is checked whether a further article number type is present in the sequence of article number types. If this is the case, the process then branches off to step 210 in which the next article number type is selected. If this is not the case, the process then branches off to a step 280 in which an appropriate message is issued to the user which states that no correspondence has been found and the object could not be identified. Step 250 then follows in which the identification of the object is completed and the process branches off to step 140.

Figure 3:
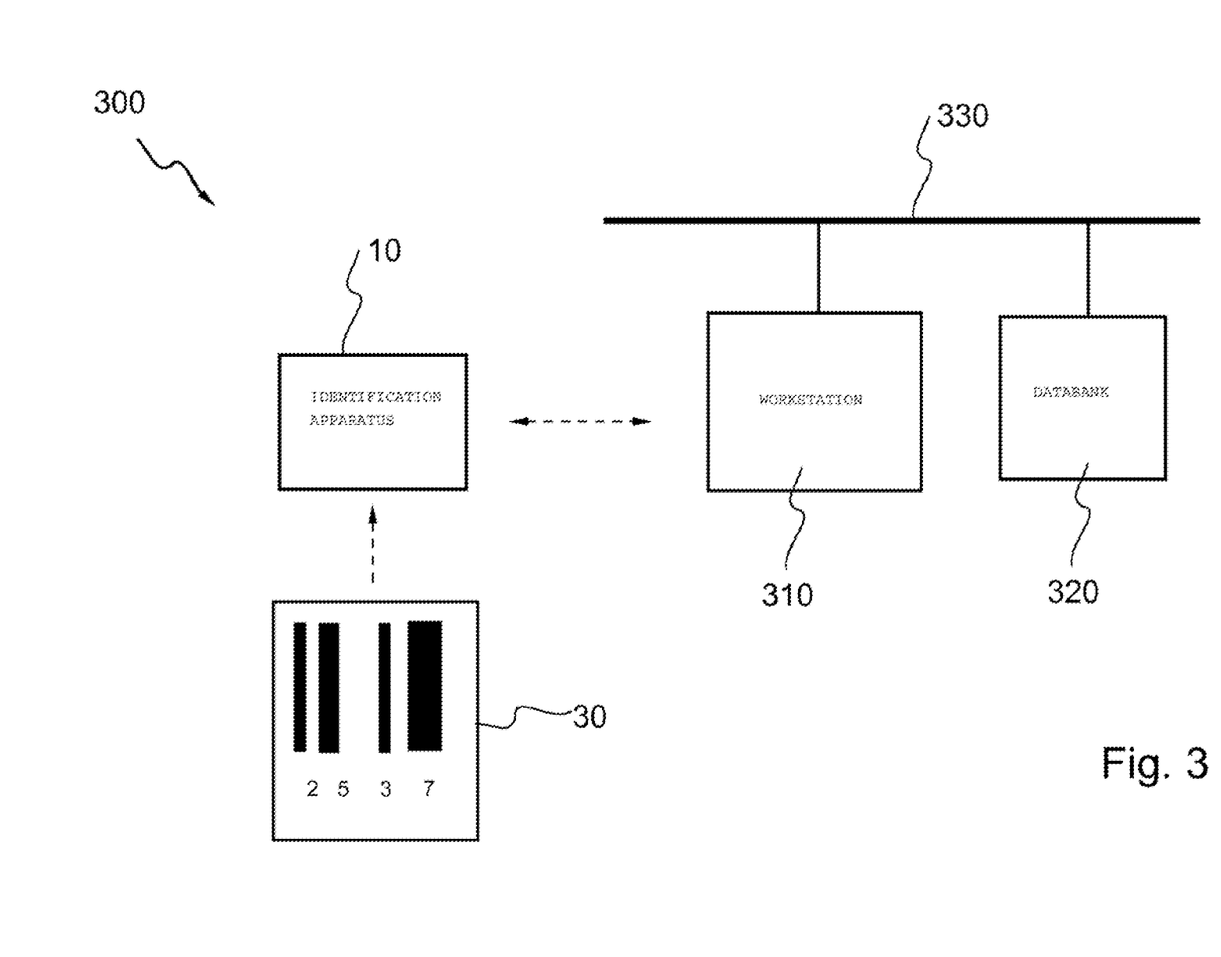

FIG. 3 shows a further exemplary embodiment of an identification apparatus 10 according to the invention in an application in a system 300 for detecting food in the hospital. The identification apparatus 10 here is a mobile device which can in particular be carried by a user into a patient's room in the hospital. For simplified processing, every patient in the hospital has a barcode assigned to him/her which is applied e.g. to the patient's bed. This barcode can be read by the mobile identification apparatus 10 and the barcode information encoded in the latter can be detected. In this case therefore a person, i.e. here the patient, is the object to be identified.

The barcodes used with this application can be barcodes of different types. Depending on the barcode type used different approaches can be chosen for processing the piece of barcode information detected. For example, with a barcode of the interleaved type only individual sections of the barcode or of the piece of barcode information detected are used in order to compare it with stored article numbers dependently upon a specified sequence of article number types. In a barcode of the interleaved type, e.g. in addition to a patient number, a detail about the hospital can also be encoded. This hospital detail is not required here, however. Advantageously, it can be specified by the user which section of the barcode or of the piece of barcode information detected is to be used for further processing.

With a barcode of the Code39 type, for the sake of simplicity, the piece of barcode information detected can be taken in its entirety for further processing.

The mobile identification apparatus 10 can be connected to a workstation 310 of the system 300 in order to keep the data available on the mobile identification apparatus 10, in particular article numbers for identifying the patients, up to date. It is also possible to connect the mobile identification apparatus 10 to the workstation 310 by means of a wireless radio connection. Normally, the current article numbers are deposited in a databank 320 of the system 300. By means of a software programme provided on the workstation 310 the workstation 310 can read out the required data, in particular article numbers, from the databank 320 and transfer them into the memory 60 of the identification apparatus 10. For this purpose the workstation 310 is connected to the databank 320 via a bus 330. The mobile identification apparatus 10 is then capable, in the way described above, of comparing the piece of barcode information detected with the stored article numbers, and so to identify the patient in a simple and reliable way.

By means of the mobile identification apparatus 10 the patient detected by means of his/her barcode can easily be assigned to food which is offered to care for the patient by the hospital kitchen. The patient can choose, for example, from a number of foods. The patient's selection is then input into the mobile identification apparatus 10 and automatically assigned to the patient. Furthermore, the selection of foods can be communicated automatically to a kitchen administration system so that the number of selected foods required for care of the patients in the hospital can easily be established.

The invention claimed is:

1. An apparatus for identifying an object with an article dependently upon barcode information detected from a barcode with which the object is identified, the apparatus comprising:
a memory in which a number of article numbers are stored which are assigned, on the one hand, to a number of articles and on the other hand to a number of different article number types, and
a control which compares the barcode information detected dependently upon a specified sequence of article number types including a PCN (Pharmacentral Number), EAN (European Article Number), IAN (Internal Article Number), and SAN (Supplier Article Number) with article numbers stored in the memory and, in the case the barcode information detected corresponding with one of the stored article numbers, identifies the object with the article assigned to this article number.

2. The apparatus according to claim 1, further comprising a detection device that is provided for detecting barcode information contained in the barcode, and the detection device being connected to the control so that the barcode information detected is transferred to the control.

3. The apparatus according to claim 1, wherein the control additionally compares the barcode information detected dependently upon at least one characteristic of the barcode information detected with article numbers stored in the memory.

4. The apparatus according to claim 3, wherein the control being implemented such that an article number type of the specified sequence of article number types is missed out dependently upon the at least one characteristic of the barcode information detected when comparing the barcode information detected with article numbers stored in the memory.

5. The apparatus according to claim 1, wherein a specific sequence of article number types is specified as a standard sequence.

6. The apparatus according to claim 1, wherein the control establishes the sequence of article number types dependently upon at least one piece of information.

7. The apparatus according to claim 6, wherein the at least one piece of information is an application- and/or environment-dependent piece of information which is dependent upon an application of the apparatus or an environment in which the apparatus is being operated.

8. The apparatus according to claim 1, further comprising an inputting device for the inputting of the sequence of article number types by a user.

9. The apparatus according to claim 1, further comprising the control establishing a sequence of article number types dependently upon a specified article number type.

10. The apparatus according to claim 9, wherein the specified article number type is placed in the first position of the specified sequence of article number types.

11. The apparatus according to claim 1, wherein the control only compares part of the barcode information detected dependently upon the specified sequence of article number types with article numbers stored in the memory.

12. An apparatus for identifying an object with an article dependently upon a piece of barcode information detected from a barcode with which the object is identified, the apparatus comprising:
a memory in which a number of article numbers are stored which are assigned, on the one hand, to a number of articles and on the other hand to a number of different article number types,
a control which compares the piece of barcode information detected dependently upon a specified sequence of article number types with article numbers stored in the memory and, in the case the piece of barcode information detected corresponding with one of the stored article numbers, identifies the object with the article assigned to this article number, and
an inputting device for the inputting of the sequence of article number types by a user, wherein the control suggesting to the user a number of pre-defined, different sequences of article number types from which a selection is made by the user.

13. An apparatus for identifying an object with an article dependently upon a piece of barcode information detected from a barcode with which the object is identified, the apparatus comprising:
a memory in which a number of article numbers are stored which are assigned, on the one hand, to a number of articles and on the other hand to a number of different article number types, and
a control which compares the piece of barcode information detected dependently upon a specified sequence of article number types with article numbers stored in the memory and, in the case the piece of barcode information detected corresponding with one of the stored article numbers, identifies the object with the article assigned to this article number,
the control establishing a sequence of article number types dependently upon a specified article number type specified by a user.

14. A process for identifying an object with an article dependently upon barcode information detected from a barcode with which the object is identified, the process comprising:
storing in a memory a number of article numbers which on the one hand are assigned to a number of articles and on the other hand are assigned to a number of different article number types, and detecting the barcode information and comparing the barcode information with article numbers stored in the memory dependently upon a specified sequence of article number types including a PCN (Pharmacentral Number), EAN (European Article Number), IAN (Internal Article Number), and SAN (Supplier Article Number), and in the case of the barcode information detected corresponding with one of the stored article numbers, the object being identified with the article assigned to this article number.

15. A process as claimed in claim 14, wherein the object is a patient at a hospital and the article is a medicine package.

16. A process for identifying an object with an article dependently upon a piece of barcode information detected from a barcode with which the object is identified, the process comprising:
   storing in a memory a number of article numbers which on the one hand are assigned to a number of articles and on the other hand are assigned to a number of different article number types;
   inputting of a sequence of article number types by a user;
   suggesting to the user a number of pre-defined, different sequences of article number types from which a selection is made by the user; and
   detecting the piece of barcode information and comparing the barcode information with article numbers stored in the memory dependently upon a specified sequence of article number types, and in the case of the piece of barcode information detected corresponding with one of the stored article numbers, the object being identified with the article assigned to this article number.

17. A process for identifying an object with an article dependently upon a piece of barcode information detected from a barcode with which the object is identified, the process comprising:
   storing in a memory a number of article numbers which on the one hand are assigned to a number of articles and on the other hand are assigned to a number of different article number types;
   establishing a sequence of article number types dependently upon a specified article number type specified by a user; and
   detecting the piece of barcode information and comparing the barcode information with article numbers stored in the memory dependently upon a specified sequence of article number types, and in the case of the piece of barcode information detected corresponding with one of the stored article numbers, the object being identified with the article assigned to this article number.

18. An apparatus for identifying an object with an article dependently upon barcode information detected from a barcode with which the object is identified, the apparatus comprising:
   a memory in which a number of article numbers are stored which are assigned, on the one hand, to a number of articles and on the other hand to a number of different article number types,
   a control which compares the barcode information detected dependently upon a specified sequence of article number types with article numbers stored in the memory and, in the case the barcode information detected corresponding with one of the stored article numbers, identifies the object with the article assigned to this article number, and
   an inputting device for the inputting of the sequence of article number types by a user, wherein the control suggests to the user a number of pre-defined, different sequences of article number types from which a selection is made by the user.

19. An apparatus for identifying an object with an article dependently upon barcode information detected from a barcode with which the object is identified, the apparatus comprising:
   a memory in which a number of article numbers are stored which are assigned, on the one hand, to a number of articles and on the other hand to a number of different article number types, and
   a control which compares the barcode information detected dependently upon a specified sequence of article number types with article numbers stored in the memory and, in the case the barcode information detected corresponding with one of the stored article numbers, identifies the object with the article assigned to this article number, the control establishing a sequence of article number types dependently upon a specified article number type specified by a user.

20. A process for identifying an object with an article dependently upon barcode information detected from a barcode with which the object is identified, the process comprising:
   storing in a memory a number of article numbers which on the one hand are assigned to a number of articles and on the other hand are assigned to a number of different article number types;
   inputting of a sequence of article number types by a user;
   suggesting to the user a number of pre-defined, different sequences of article number types from which a selection is made by the user; and
   detecting the barcode information and comparing the barcode information with article numbers stored in the memory dependently upon a specified sequence of article number types, and in the case of the barcode information detected corresponding with one of the stored article numbers, the object being identified with the article assigned to this article number.

21. A process as claimed in claim 20, wherein the object is a patient at a hospital and the article is a medicine package.

22. A process for identifying an object with an article dependently upon barcode information detected from a barcode with which the object is identified, the process comprising:
   storing in a memory a number of article numbers which on the one hand are assigned to a number of articles and on the other hand are assigned to a number of different article number types;
   establishing a sequence of article number types dependently upon a specified article number type specified by a user; and
   detecting the barcode information and comparing the barcode information with article numbers stored in the memory dependently upon a specified sequence of article number types, and in the case of the barcode information detected corresponding with one of the stored article numbers, the object being identified with the article assigned to this article number.

23. A process as claimed in claim 22, wherein the object is a patient at a hospital and the article is a medicine package.

* * * * *

UNITED STATES PATENT AND TRADEMARK OFFICE
CERTIFICATE OF CORRECTION

PATENT NO. : 8,418,921 B2
APPLICATION NO. : 12/745874
DATED : April 16, 2013
INVENTOR(S) : Jonas Hinz et al.

It is certified that error appears in the above-identified patent and that said Letters Patent is hereby corrected as shown below:

In the Claims

In Column 11, Claim 2, line 49, after "for detecting" insert --the--.

Signed and Sealed this
Sixteenth Day of July, 2013

Teresa Stanek Rea
*Acting Director of the United States Patent and Trademark Office*